United States Patent [19]

Cheng

[11] 4,179,684
[45] Dec. 18, 1979

[54] GRAPHIC CONVERSION SYSTEM FOR ELECTRONIC DATA PROCESSING

[76] Inventor: George C. Cheng, 2220 SW. 34th St. #106, Gainesville, Fla. 32608

[21] Appl. No.: 490,012

[22] Filed: Jul. 19, 1974

[51] Int. Cl.² .............................................. G06K 9/00
[52] U.S. Cl. ................... 340/146.3 AE; 340/146.3 H; 358/260; 364/515
[58] Field of Search ........... 340/146.3 AG, 146.3 AE, 340/146.3 H, 324 A, 146.3 R; 178/DIG. 3, DIG. 34; 364/515; 358/260

[56] References Cited

U.S. PATENT DOCUMENTS

| | | | |
|---|---|---|---|
| 3,757,038 | 9/1973 | Jannery et al. | 340/324 A |
| 3,813,646 | 5/1974 | Quarmby | 340/146.3 AE |
| 3,818,475 | 6/1974 | Hussey | 340/324 A |
| 3,830,965 | 8/1974 | Beaudette | 178/DIG. 3 |

OTHER PUBLICATIONS

Chow et al. "Boundary Extraction Method and Algorithm," *IBM Tech. Disclosure Bulletin*, vol. 14, No. 4, Sep. 1971, pp. 1301-1304.
Sidhu et al. "Property Encoding:(etc.)"*IEEE Transactions on Computers*, vol. C-21, No. 11, Nov. 1972, pp. 1206-1216.

Primary Examiner—Leo H. Boudreau
Attorney, Agent, or Firm—Nicholas J. Aquilino; James F. Cottone

[57] ABSTRACT

An apparatus and method for graphic conversion for electronic data processing wherein an image is converted to an electrical analog signal which is converted to digital data representing discrete segments of the image containing color value data. The digital data is converted to an analog signal by a curve fitting technique responsive to adjacent discrete segments and the analog signal drives a visual display means which recreates the original image. Means are provided to store and/or modify the digital data to effect predetermined changes in the recreated images.

11 Claims, 14 Drawing Figures

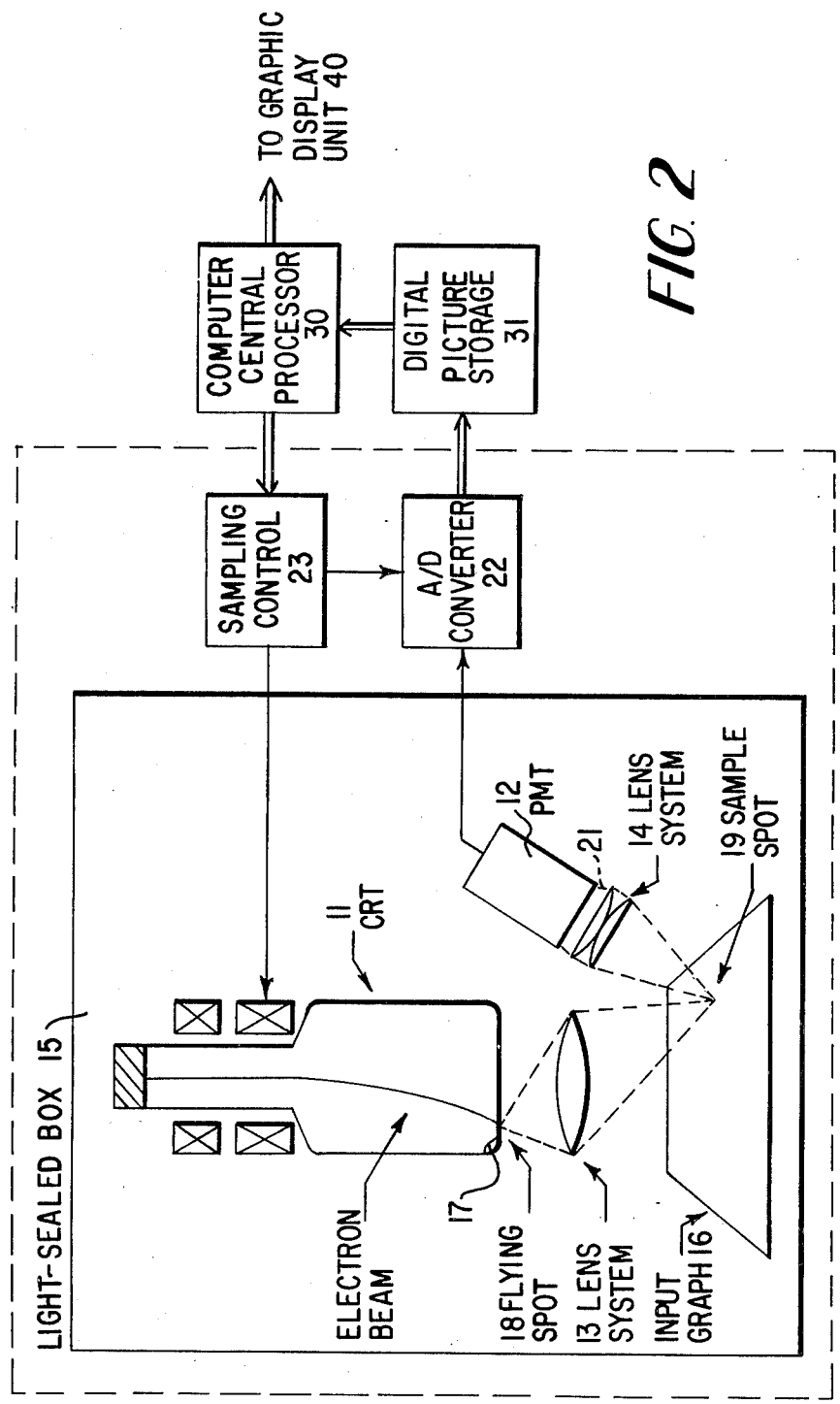

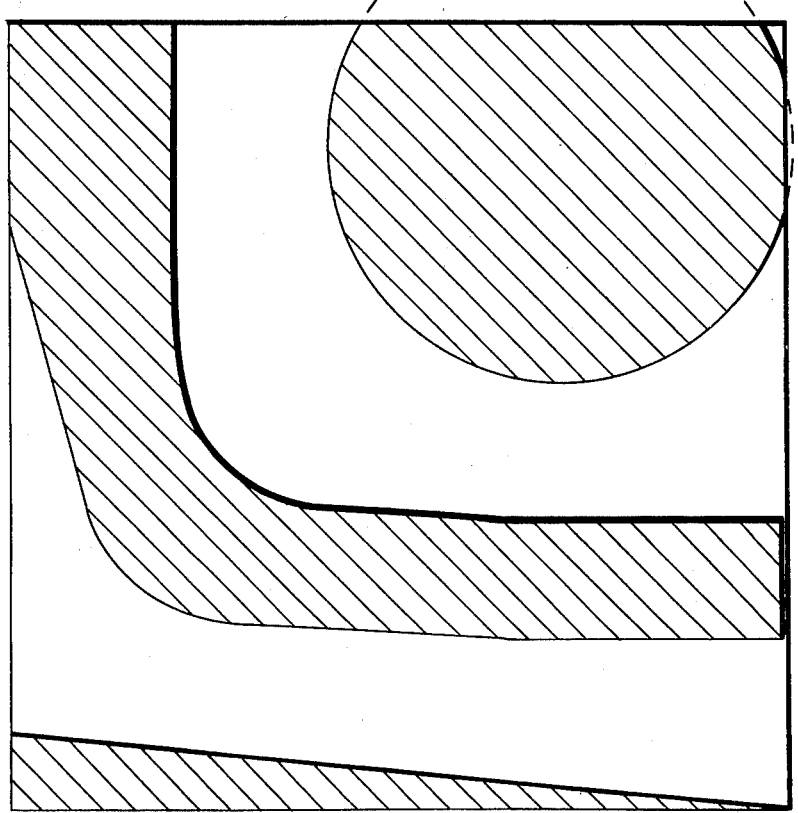

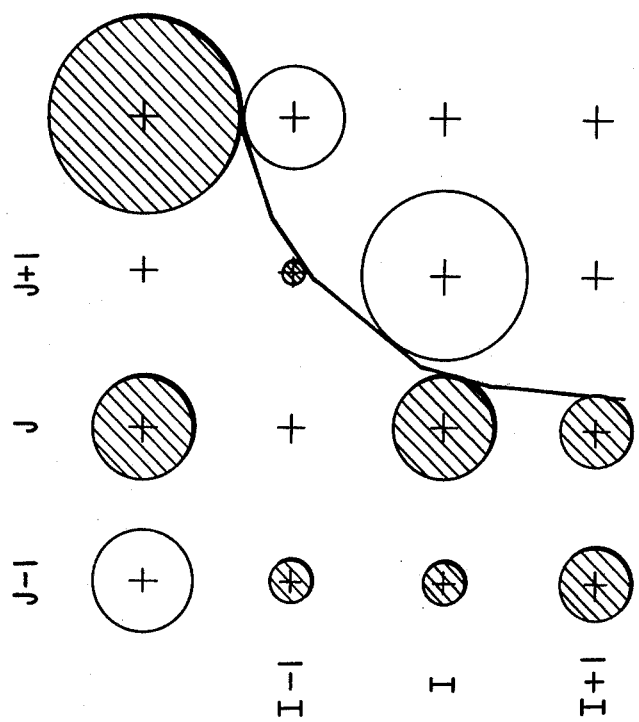
FIG. 12
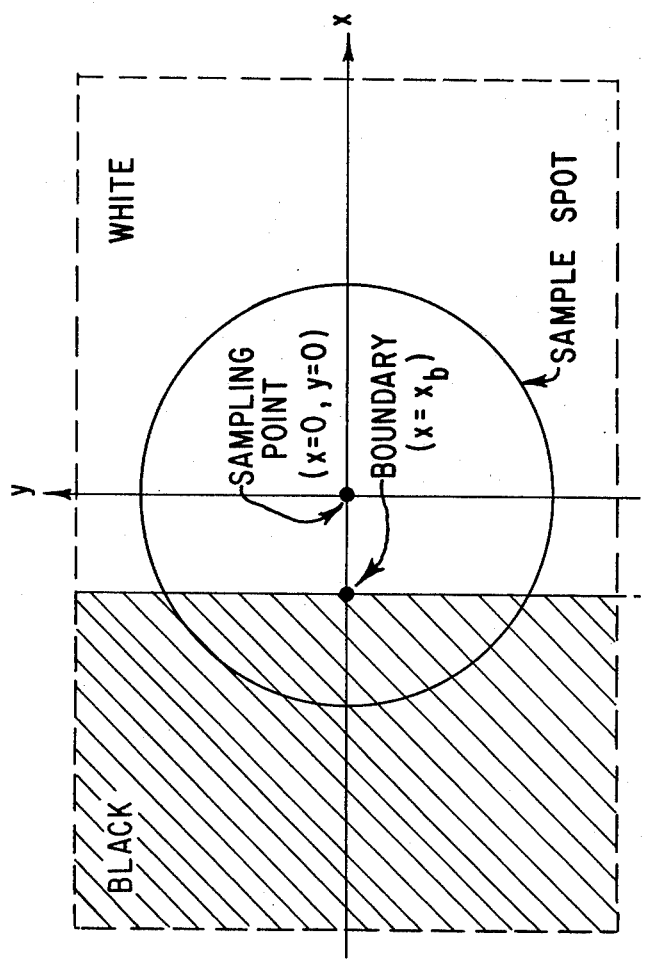
FIG. 7
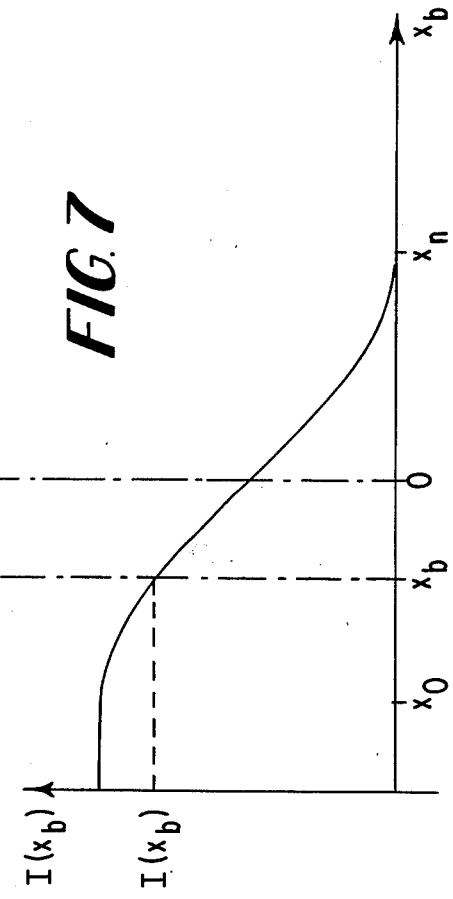

$GLS_a (I, J+1) = 11+8 = 19$
$GLS'_a (I, J+1) = 2+10 = 12$
$GD_a (I, J+1) = |19-12| = 7$ $GLS_b (I, J+1) = 11+0 = 11$
$GLS'_b (I, J+1) = 2+15 = 17$
$GD_b (I, J+1) = |11-17| = 6$ $GLS_b (I+1, J) = 11+10 = 21$
$GLS'_b (I+1, J) = 2+0 = 2$
$GD_b (I+1, J) = |21-2| = 19$

GRAPHIC CONVERSION SYSTEM FOR ELECTRONIC DATA PROCESSING

FIELD OF THE INVENTION

This invention relates to a method and apparatus for converting pictorial graphic data into digital data compatible with electronic data processing systems and also provides a means to enable recreating a pictorial graphic display from the processed data.

BACKGROUND OF THE INVENTION

Electronic data processing systems for handling graphic data are well known in commercial, industrial, and scientific fields as a means to save time, space and manpower.

The industry presently utilizes graphic electronic data processing equipment which is comprised of three basic parts, a picture digitization unit, a computer processing unit and a graphic display unit. The picture digitization unit converts a picture such as an ordinary graph, engineering drawings, photographs and so forth into a complex form of binary numbers wherein the various portions of the binary number represents discrete portions of the illustration.

The group of binary numbers may be processed by a computer unit and manipulated in accordance with normal digital programing techniques. For instance the data may be altered such that when recreated, a different picture is generated, or measurements may be made from the data to provide information relating to the size and or ratio of the various portions of the original or modified image as represented by the digital data. The illustration in the form of digital data may be stored by any of a variety of means common to the computer industry and recalled by normal programming techniques for processing, manipulation or to create a visual recreation of the original or modified image.

The recreated visual display may be in the form of an electronically controlled ink drawing, a print out machine typing x's, o's, dashes, dots or other such symbols at certain specified points on a piece of paper in accordance with the stored digital data, a cathode ray tube screen display, a laser recording on a film based media, or any one of a number of graphic display apparatus adaptable to be controlled by a computer data output.

The present state-of-the-art of graphic electronic digital processing has a relatively coarse upper limit of precision in the converted data when compared to the precision of an ordinary photographic print. Also the cost of manufacturing a high precision graphic electronic data processing system is prohibitive and such systems designed within the present state-of-the-art are difficult to maintain.

A certain amount of degradation exists in present day graphic electronic data production equipment which results in linear precision errors of approximately one percent in even the most sophisticated system.

SUMMARY OF THE INVENTION

An apparatus constructed in accordance with the invention presented herein and the method of graphic electronic data production permitted by this system provides a much higher precision than is presently known in the art. However this is accomplished with hardware and with techniques that are no more costly than conventional systems. Basically the new technique utilized by the system of this invention enables a high linear precision. This results in an improvement factor over conventional systems at least of 30, with respect to linearly and an improvement factor of 1,000 with respect to area.

The invention described by this patent incorporates a new graphic conversion method based on a thorough understanding of the principles and limitations of pictured digitization processes and the utilization of quantitative relationship between input graph data and the digital picture. This is accomplished by interpolating individual segments of the digital picture in accordance with its gray scale value as contrasted to the present state-of-the-art method of truncating individual segments of a digital picture in accordance with its gray scale value.

The primary objective of the invention described and defined by this patent is to produce a graphic electronic data processing system which increases the accuracy over present state-of-the-art systems by at least one hundred times without an increase in cost, manpower requirements or hardware requirements.

BRIEF DESCRIPTION OF THE DRAWINGS

The above and other advantages of the invention will become more clearly understood from a consideration of the following description taken in connection with the accompanying drawings in which:

FIG. 2 illustrates a flying-spot scanner picture digitization system as utilized by the system defined in this patent, FIG. 3 is an illustration of a section of an input graph, FIG. 4 is a graphic digital representation including the gray scale values of the illustration of FIG. 3, FIG. 7 illustrates the one-to-one quantitative relationship between the electrical signal and the boundary line location, FIG. 12 depicts the boundary recreated by using boundary associated tangents.

DETAILED DESCRIPTION OF THE PREFERRED EMBODIMENTS

Basic Picture Digitization Principles

Figure 1:
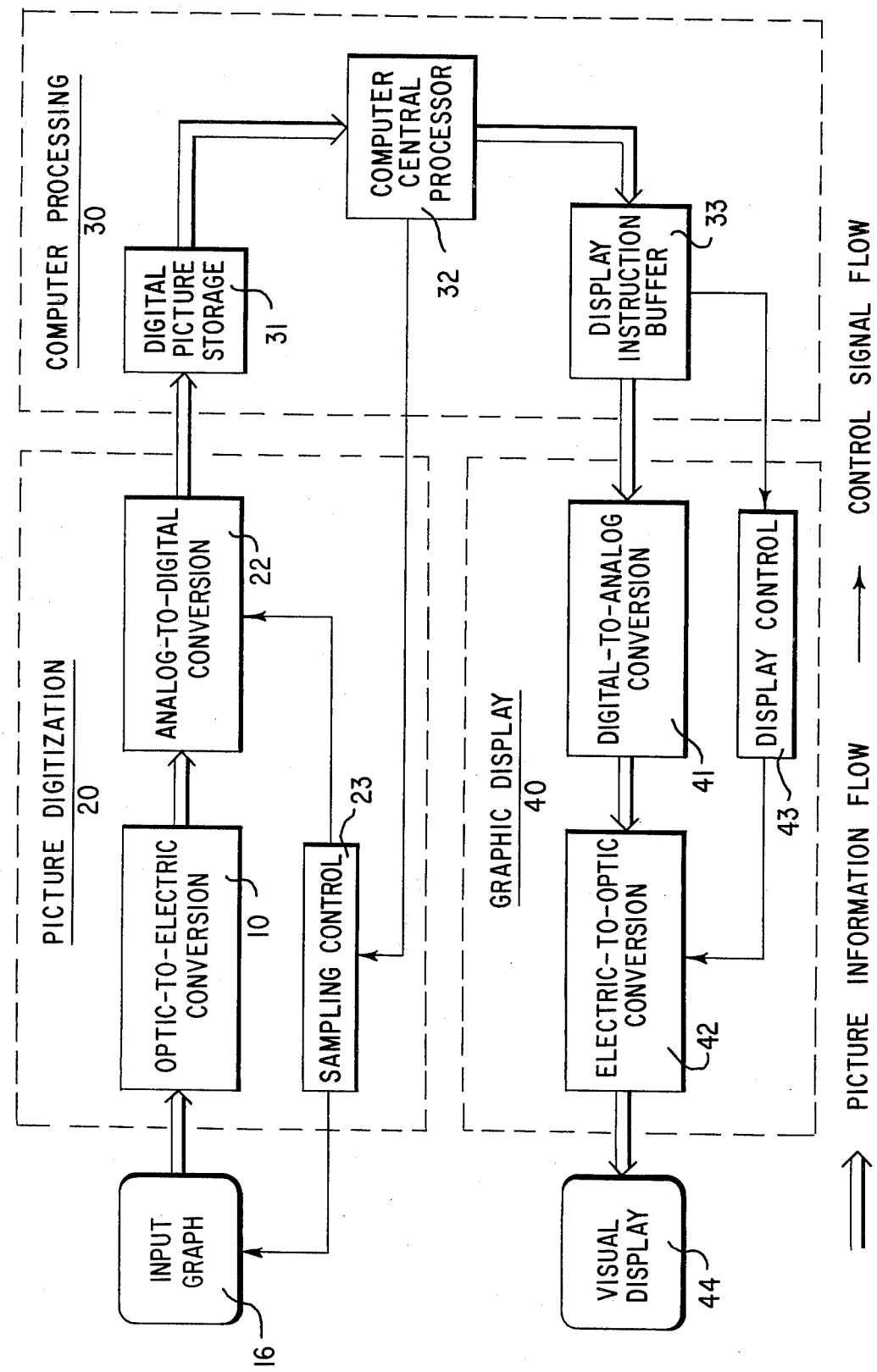
FIG. 1 is a functional block diagram of a typical graphic electronic data processing system.

The three major parts of a picture digitization unit are illustrated in FIG. 1. The Optic-to-Electric Conversion (10) which, for example, can be accomplished by a system consisting of a cathode ray tube (CRT) (11), a photomultiplier tube (PMT) (12), and a pair of optic lens systems (13 and 14) enclosed in a light sealed box (15) together with the input graph (16). FIG. 2 illustrates the details of such an arrangement. The CRT generates a beam of electrons which is focussed on the phosphor screen (17) of the CRT (11) to produce a small spot of light (18) i.e. the flying spot. The lens system (13) focusses the CRT spot image (18) on the input graph (16). The CRT spot image on the input graph (16) is normally referred to as a scanning spot. The lens system (14) guides the reflected light from the sample spot (19) to the photosensitive face (21) of the PMT (12). The center of the sample spot is normally referred to as the sampling point. The PMT (12) produces an electrical current proportional to the intensity of the light striking its light detecting face (21). In other words, the PMT (12) output, i.e. an electrical signal, represents the brightness or inversely, the grayness, of the sample spot (19) on the input graph (16). In this way, the optical information is converted into electrical signals.

The input graph (16) is not sampled continuously. It is sampled at discrete points to provide digital data points that may be processed by a digital computer. The sampling points are spaced apart far enough so that their associated sample spots do not overlap one another. Otherwise, the digital picture generated from the PMT output would represent a degraded version of the input graph in that the sharp boundary between the black and white regions would be smeared into a gray band and the precise location of the boundary in the input graph could not be retrieved. The flying spot scanner produces the smallest sample spot among all the picture digitization devices. The lower limit of the size of a sample spot is the main factor of the graphic data precision limitation in the graphic electronic data processing system.

The CRT spot size or diameter refers to the width between the two half amplitude points on the spot intensity profile. This is because the spot intensity profile is measured by scanning the CRT flying spot perpendicularly to a thin slit and the PMT output represents approximately the spot intensity profile. The mathematical representation of the spot intensity profile is presented as the following:

Let $G(x,y)$ denote the light intensity distribution of the CRT scanning spot. This function is also referred to as the spread function in the field of optics. The CRT scanning spot spread function is rotational symmetrical with respect to its center if the CRT spot is in the central portion of the CRT screen. The maximal value of the CRT spot spread function occurs at the spot center. For the convenience of analysis, a coordinate system is chosen so that the spot center is at the origin (i.e. $x=0$, $y=0$). The spot intensity profile can be expressed as the following, $$G_p(x) = \int_{-\infty}^{\infty} G(x,y)\, dy$$

where the flying spot scanning direction coincides with the x-axis. The peak of the spot intensity profile is at $x=0$, i.e.

$$G_p(0) = \max\{G_p(x)\}$$

Let $$G_p(x_h) = G_p(0)/2$$

where $G_p(x_h)$ is called the half amplitude of the profile. There are two points which meet the half amplitude condition. These two points are called the half amplitude points and the CRT spot diameter is defined as the width between these two half amplitude points, i.e. let $x_{h1}$ and $x_{h2}$ denote the two half amplitude points.

The CRT spot diameter $= |x_{h1} - x_{h2}|$ The CRT spot is usually considered as a Gaussian spot, i.e.

$$G(x,y) = A \exp[-(x^2+y^2)/2\sigma^2]$$

The half amplitude points are $$x_{h1} = +1.75\sigma$$

and $$x_{h2} = -1.75\sigma$$

The CRT spot diameter is $$x_{h1} - x_{h2} = 2.35\sigma$$

The light intensity contained between the two half amplitude points of the spot intensity profile is about 76% of the total spot intensity if the spot is Gaussian. About 60% of the total Gaussian spot intensity is contained within a circular region at the spot center with its diameter equal the spot diameter i.e. $2.35\sigma$. Therefore, if the sampling points are spaced apart by a spot diameter on a square grid, 40% of each sample spot overlaps with its neighbors, and the converted digital picture would be severely degraded.

The output of the PMT is applied to an analog-to-digital (A/D) converter (22). The PMT output electrical signal is an analog signal in which the information is conveyed by the signals instantaneous magnitude which varies with respect to time. The output of the A/D converter (22) is a digital signal in which the information is conveyed by the pattern of electrical pulses (or states) either serially in time or parallel in time by means of a number of terminals. The A/D conversion is needed because the digital computer cannot accept the analog signal. For the consideration of precision in measurement, the analog signal can be represented by a real number whose Cardinal Number is infinite, on the other hand, the digital signal can be represented by an integer of a finite set whose Cardinal Number is limited to less than 100 for the graphic electronic data processing systems due to the physical limitations of the electronic devices. The function of the A/D converter (22) is to compare the PMT output analog signal with a set of predetermined electrical signal levels and to generate a digital signal, designated by an integer, representing the matched level. This integer number is referred to as the gray level, which is the value of a digital picture element corresponding to a sample spot. This truncation of a real number, i.e. the analog signal into an integer, (namely the digital signal) is another factor of precision limitation of the graphic electronic data processing system.

The sampling control (23) of the picture digitization unit can be directed by a computer on-line and/or by a prefixed electronic circuit. In most of the graphic electronic data processing systems, the locations of sampling points and the sampling order are predetermined. The sampling control electronic circuit generates a sequence of electrical signals to control the CRT electron beam so that the flying spot (18) scans the CRT screen (17) in parallel lines. Corresponding to the flying spot scanning, the PMT (12) produces a time varying electrical analog signal reflecting the grayness of the input graph along the scan lines. The sampling control unit (23) also generates sampling signals so that the PMT output analog signal is A/D converted at only certain instants. Each sampling instant corresponds to a sampling point on the input graph. The sampling points are usually located on a square grid.

The gray level, represented by the binary coded digital signal, is stored in the digital picture storage (31) which is an electronic or magnetic device. The digital picture elements, represented by their gray levels, are conceptually arranged in a matrix according to the corresponding sampling points on the input graph. In the conventional graphic display, each digital picture element represents a small square region called sample square. The sample square is centered at a sampling point with its edge equal the sampling spacing, i.e. the distance between two immediate neighbor sampling points. A computer program determines whether a sample square is black or white based on the gray level of the associated digital picture element (or plus that of its neighbors in more sophisticated cases). For example, the algorithm generating the display of FIG. 5 simply assigns the sample square to white if the associated gray level is less than 8 as indicated in FIG. 4, and to black if otherwise. The precision of this display is limited to 4 mil$^2$ (=2×2 mil$^2$) which is the area of the sample square. The finite sample square area is due to the limitation on the sampling spacing, which in turn is due to the finite sample spot size.

The quantitative relationship between the sample spot on the input graph and the corresponding digital picture element is the key point of the new graphic conversion technique described by this patent. For a monochromatic picture, the relationship between the input graph and the digital picture can be considered as a special Fourier transformation. Theoretically, a picture consisting of black and white regions has an infinite spatial frequency bandwidth, and the theory of picture Fourier transformation does not have practical meaning for this class of pictures. The quantitative relationship between an input graph of this class and the digital picture has never been established heretofore. Therefore, this quantitative relationship is presented here. A test graph consisting of a black region and a white region is utilized to establish this quantitative relationship. The boundary between these two regions is a straight line, which is referred to as the black/white boundary line. In order to facilitate the following analysis, a special cartesian coordinate system is chosen to describe the geometrical plane of the input graph. In this special coordinate system, the origin (i.e. x=0, y=0) coincides with the sampling point in consideration; and the x-axis is perpendicular to the black/white boundary line, see FIG. 7. Let $x_b$ denote the x-coordinate of the black/white boundary line. Therefore, $|x_b|$ is the distance between the black/white boundary line and the sampling point in consideration. The coordinate $x_b$ also completely describes the location of the black/white boundary line with respect to the sampling point in consideration, and is referred to as the location of the black/white boundary line.

When the sampling point is on boundary line, $x_b=0$; when the sampling point is in the black region $x_b>0$; and when the sampling point is in the white region, $x_b<0$.

The PMT output with respect to various locations of the black/white boundary line can be expressed as a curve of $I(x_b)$ vs $x_b$, where $I(x_b)$ is the PMT output corresponding to a black/white boundary line located at $x_b$.

The curve of $I(x_b)$ vs $x_b$ provides a one-to-one quantitative relationship between the PMT output analog signal and the location of the black/white boundary line. In other words, given a PMT output $I(x_b)$, the location $x_b$ of the black/white boundary line as with respect to the sampling point in consideration can be uniquely determined from the curve of $I(x_b)$ vs $x_b$. On the other hand, the relationship between the A/D converter output digital signal (i.e. gray level) and the location of the black/white boundary line is not one-to-one. Given a gray level, the location of the black/white boundary line cannot be uniquely determined, but any black/white boundary line located at the many (mathematically uncountable infinite many) possible places within a certain interval could produce the same gray level. The exact limits of the interval corresponding to a given gray level depends on the gray level truncation scheme in use.

For the conventional linearly scaled gray level truncation scheme, the total range of the PMT output is divided into N equal intervals, where N is the precision of the gray level truncation. Let $I_k$, k=0,1,...,N, be the dividing points. $I_0$ is the PMT output corresponding to a totally white sample spot (or theoretically, $x_b=-\infty$), $I_N$ is the PMT output corresponding to a totally black sample spot (or $x_b=+\infty$), and the intermediate dividing point $I_k$ can be expressed as the following, $$I_k = I_{k+1} - \frac{1}{N}(I_N - I_0)$$

where $(1/N)(I_N-I_0)$ is the length of each interval. Under this gray level truncation scheme, the A/D converter would produce a digital signal representing the gray level k, if the magnitude of the PMT output is between $I_k$ and $I_{k+1}$.

Corresponding to the dividing points ($I_k$)'s, a set of points on the $x_b$-axis can be determined from the curve of $I(x_b)$ vs $x_b$. Let $x_k$ be the point on $x_b$-axis corresponding to $I_k$. Given a black/white boundary line located between $x_k$ and $x_{k+1}$ (with respect to a given sampling point), the PMT output is between $I_k$ and $I_{k+1}$, and the A/D converter would produce a digital signal representing the gray level k. On the other hand, given a digital picture element of gray level k, the location $x_b$ of the black/white boundary line that produces the gray level can be estimated within the interval between $x_k$ and $x_{k+1}$ (i.e. $x_k \leq x_v < x_{k+1}$ as with respect to the sampling point associated with the given digital picture element).

Therefore, the quantitative relationship between the input graph (i.e. the location of the black/white boundary lines) and the digital picture (i.e. the gray level of the digital picture elements) can be expressed by the intervals between $x_k$ and $x_{k+1}$ for k=0,1,...,(N−1), and the corresponding gray level k. For example, if the black/white boundary line was located in the interval between $x_4$ and $x_5$ as with respect to the sampling point in consideration, the A/D converter would produce a digital picture element of the gray level 4 when the CRT flying spot image is centered at the sampling point. Inversely, given a digital picture element of gray level 4, the exact location of the original black/white boundary line cannot be retrieved, but it can be estimated with complete certainty as in the interval between $x_4$ and $x_5$ with respect to the associated sampling point.

When the scanning technique, such as flying spot scanning, is used to sample the input graph, every point on the scan line can be considered as a sampling point. Therefore, the sampling point that produces a PMT output of $I_m$, where $m=N/2$, is a point that coincides with a black/white boundary line. The set of these boundary line coincided sampling points of the entire input graph can be used to recreate the input graph. Of course, the precision is determined by the accuracy of the timing circuit. The sampling rate needed for this scheme is much higher than the fixed rate described in the following section. The higher sampling rate requires wider frequency bandwidth and higher speed of the circuit design, which in turn requires higher cost.

BOUNDARY TANGENT CIRCLE GRAPHIC CONVERSION TECHNIQUE

Figure 6:
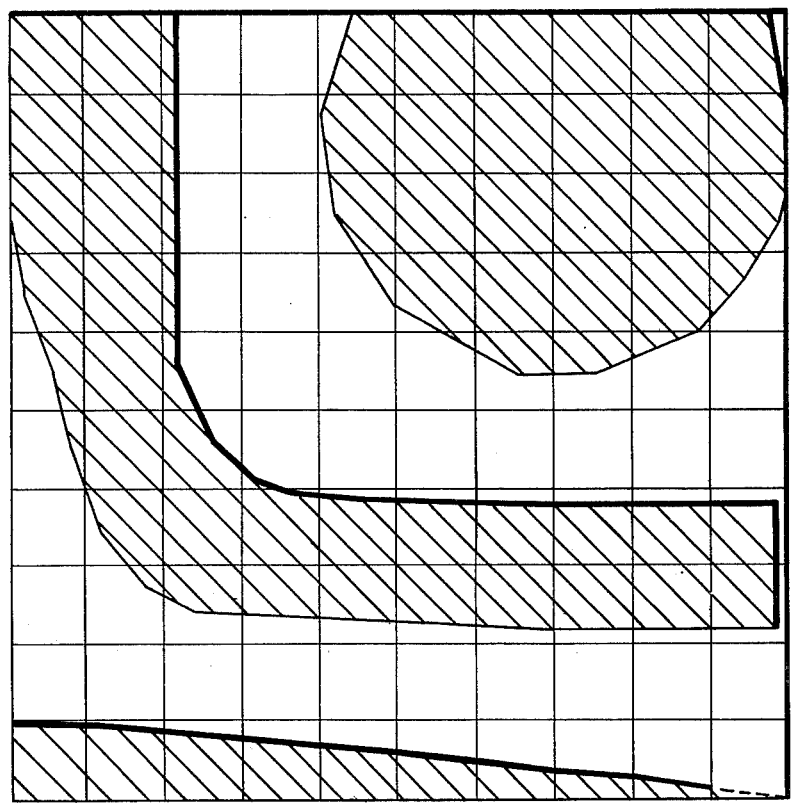
FIG. 6 is a graphic display generated by the graphic conversion technique taught by the system presented by this patent.
Figure 5:
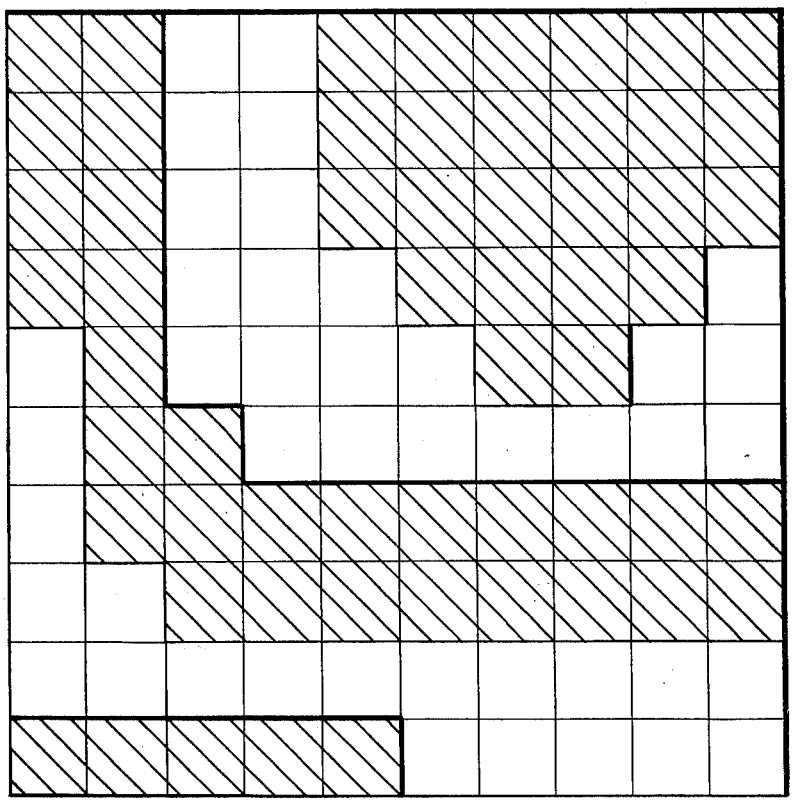
FIG. 5 is a graphic display generated from trucated digital data contained in FIG. 4 in accordance with the present state-of-the-art systems.
Figure 8:
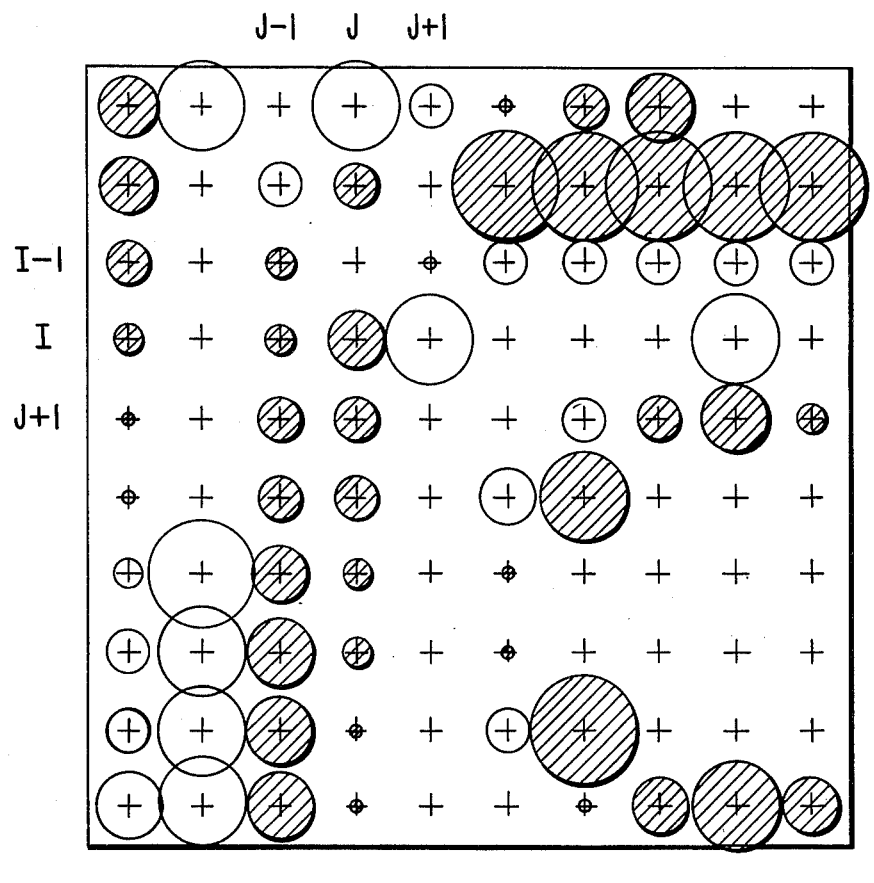
FIG. 8 depicts the BTC's virtually generated from the digital picture of FIG. 4.
Figure 9:
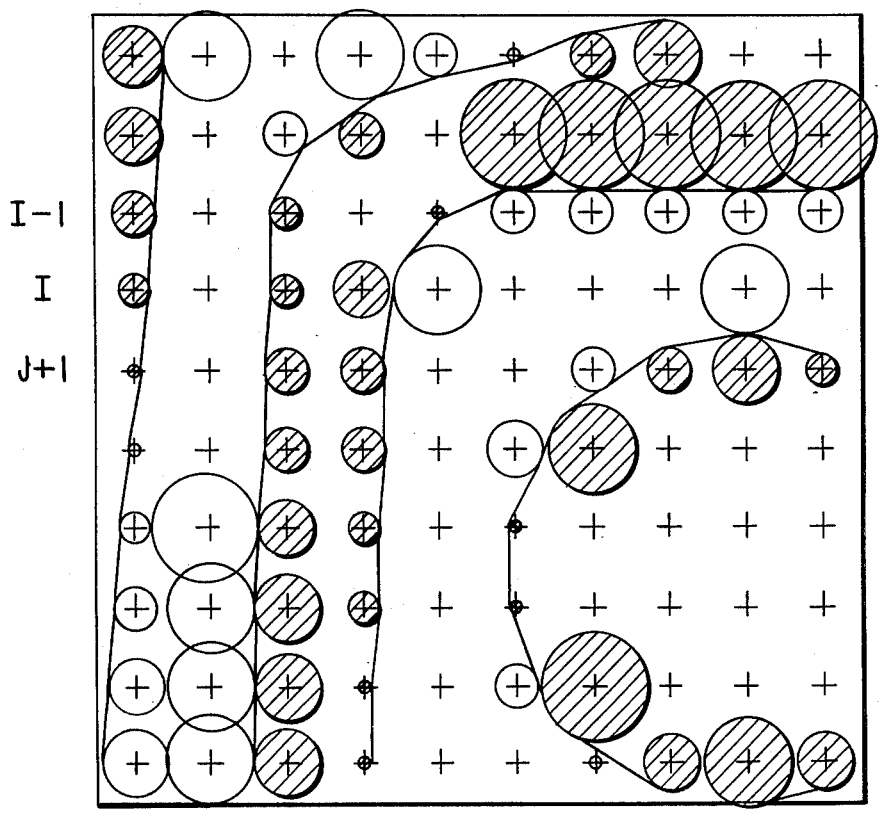
FIG. 9 is a graphic display of the boundary recreation by the type I boundary points method.

The new graphic conversion technique presented by this patent produces an output graph in the form of a high precision line drawing as shown in FIG. 6, which is different from the prior art or conventional form of a matrix of black and white sample squares as shown in FIG. 5. The lines (or curves) in the new form of output graph are the boundaries between the black and white regions in the graph, and are referred to as the boundary curves. Each boundary curve is constructed by connecting a set of boundary points in a certain order, either in the straight forward manner of line segment approximation or by more sophisticated curve interpolation methods. These boundary points are derived from the boundary tangents, which are the lines tangent to the boundary tangent circles (BTC). A BTC is a circle centered at a sampling point and its radius is derived from the gray level of the associated digital picture element. See FIGS. 8 and 9.

The precision of the conventional output graph is limited by the sampling spacing. On the other hand, the precision of the new graphic output is limited by the precision of gray level truncation. The area precision of the new graphic output is about $N^2/2$ times better than that of the conventional output graph with the same flying spot scanner capacity, where N is the precision of gray level truncation of the system. For examples, for a 16 gray level system the improvement is about a hundred times, i.e. about $16^2/2$; and for a 64 gray level system the improvement is about two thousand times better, i.e. $64^2/2$. This precision also implies the accuracy in measurement. In the actual computation, the coordinates of the boundary points derived from the BTC's can have much higher precision than that mentioned above. However, the accuracy is limited by the precision of the radius of the BTC, which in turn is limited by the precision of the gray level truncation.

The digital picture produced by the prior art of conventional gray level truncation scheme can be used to generate BTC's. However these BTC's are not convenient to use for generating the new graphic output because their radii cannot be scaled to match the precision capacity of the display unit without further degradation. Therefore to achieve an overall better system performance, a new gray level truncation scheme is introduced later in the patent.

The quality of the new output graph depends on the relative smoothness of the black/white boundary curves in the input graph (i.e. relative with respect to the sampling spacing). Therefore a quantitative smoothness measure can be used to establish the criteria for the application of the new graphic conversion technique and to guide the trade-offs between the sampling spacing and the precision of gray level truncation in order to achieve optimal system performance.

The neighborhood of each BTC is used to aid in generating the boundary points, because the individual BTC does not provide sufficient information about the orientation of the boundary tangent, which is needed to derive the boundary points. Among the four immediate neighbors of each BTC, only two can be used to generate the boundary tangents.

The order of connecting the boundary points is essential to form a boundary curve.

The generating of boundary points and the boundary curves can be accomplished by using a general purpose digital computer, but the operational cost would be high and the time to generate the boundary points would be too long for on-line processing. All the operations of this new graphic conversion technique can be implemented into hardware system (i.e. electronic digital circuits), so that the high operational cost and the long serial processing time on digital computer can be avoided.

As illustrated in FIGS. 1 and 2, the equipment required includes a picture digitization unit (20); an electronic processing system or computer (30) which includes a digital picture storage means (31); a computer central (32) processor and a display instruction buffer (33); and a graphic display (40). The graphic display assembly (40) includes a digital-to-analog conversion means (41), an electric-to-optic conversions means (42) and, a display control (43). The graphic display assembly (40) produces the final visual display (44) which may be an image on a screen such as a CRT or it may be a hard copy.

The BTC's that could be generated from the gray levels produced by conventional linearly scaled truncation schemes are not convenient to generate the new output graphic display. Because the radii of these BTC's cannot be scaled to match the precision capacity of the display unit without further degradation (i.e. further truncation). Instead, a gray level truncation scheme which produces a set of gray levels such that the increment between two radii of the BTC's generated from two adjacent gray levels is constant among all gray levels. This constant increment of radii of BTC's can be scaled to match the precision of the display unit so that further degradation can be avoided.

In this gray level truncation scheme, let $I_b$ and $I_w$ denote the magnitudes of the PMT output electrical currents corresponding respectively to a totally black sample spot and a totally white sample spot. Let $x_N$ denote the point on the $x_b$-axis corresponding to $I_b$ as determined from the curve of $I(x_b)$ vs $x_b$, where N is the precision of gray level truncation. Let $x_0$ denote the point on the $x_b$-axis corresponding to $I_w$. Then gray level truncation can be accomplished by dividing the range between $x_0$ and $x_N$ on $x_b$-axis into N equal intervals. Let $x_k$, $k=0,1,\ldots,N$, denote the dividing points, i.e.

$$x_{k+1} - x_k = (1/N)(x_N - x_0)$$

Let $I_k$ denote the point on $I(x_b)$-axis corresponding to the dividing point $x_k$ on $x_b$-axis, where $I_0 = I_w$ and $I_N = I_b$. Note that the divided intervals on $I(x_b)$-axis are not all equal in general as that in the conventional linearly scaled truncation scheme. In the case of this gray level truncation scheme, the A/D converter would produce a digital signal representing the gray level k if the PMT output is between the dividing points $I_k$ and $I_{k+1}$. In other words, if a black/white boundary line is located at $x_b$ (as with respect to the coordinate system that its origin is at the sampling point in consideration), such that $x_k \leq x_b < x_{k+1}$, the PMT output, $I(x_b)$ is between $I_k$ and $I_{k+1}$, i.e. $I_k \leq I(x_b) < I_{k+1}$ when the CRT flying spot image is centered at the sampling point in consideration; and the A/D converter will produce a digital signal representing the gray level k.

The radius of a BTC corresponding to the gray level k is chosen as the min-point of the k-th interval on the $x_b$ axis as described above. Let $r_k$ denote the radius of BTC corresponding to the gray level k, $$r_k = \tfrac{1}{2}(x_{k+1} - x_k)$$

Table I lists the corresponding gray levels, BTC radii, boundary line locations, and a function of PMT output, i.e. $(I_k - I_b)/(I_w - I_b)$ of the sixteen gray level system used in the illustrative example. In the gray level truncation scheme used to generate Table I, the dividing points $x_k$ are $$x_k = -1.6 + 0.2k \text{ (mil)}$$

and the radius of the BTC corresponding to the gray level k is $$r_k = |-1.5 + 0.2k| \text{ (mil)}$$

Note that the radii of the BTC's corresponding to the gray levels 0 and 15 are not listed in Table I. The interval between $x_0$ and $x_1$, and that between $x_{14}$ and $x_{15}$ do not equal the remaining intervals, this is for practical reasons and does not effect the principle of the gray level truncation scheme.

Table I
List of the parameters of the gray level truncation scheme

| Gray level k | BTC radius* $r_k$ | Boundary-line Location* $x_k$ | PMT Output $\dfrac{(I_k - I_b)}{(I_w - I_b)}$ |
|---|---|---|---|
| 0 | — | — | — |
| 1 | 1.3 mil | −1.4 mil | 95% |
| 2 | 1.1 mil | −1.2 mil | 92% |
| 3 | 0.9 mil | −1.0 mil | 88% |
| 4 | 0.7 mil | −0.8 mil | 83% |
| 5 | 0.5 mil | −0.6 mil | 76% |
| 6 | 0.3 mil | −0.4 mil | 68% |
| 7 | 0.1 mil | −0.2 mil | 59% |
| 8 | 0.1 mil | 0.0 mil | 50% |
| 9 | 0.3 mil | +0.2 mil | 41% |
| 10 | 0.5 mil | +0.4 mil | 32% |
| 11 | 0.7 mil | +0.6 mil | 24% |
| 12 | 0.9 mil | +0.8 mil | 17% |
| 13 | 1.1 mil | +1.0 mil | 12% |
| 14 | 1.3 mil | +1.2 mil | 8% |
| 15 | — | +1.4 mil | 5% |

*The values of the BTC radii and Boundary-line Locations depend on the sampling spot size. For a scanner whose sampling spot size is not uniform over the total scan area, a set of lists of the parameters of the gray level truncation scheme such as Table I is constructed, each list relates to a particular location of the sampling point in according to the sampling spot size at that location.

The basis of the graphic conversion technique is the quantitative relationship between the gray level and the location of black/white boundary line. In order for this quantitative relationship to be utilized in graphic conversion, the class of input graphs is restricted to only black and white regions. In the general case, it is the class of pictures that consist of two colors, whereas the illumination of each color region is homogeneous, so that the regions of one color can be considered as black and the regions of the other color as white. There are two graphic characteristics of the two-color class input graph that effect the applicability of the new graphic conversion technique, namely, the region width and the boundary curve smoothness.

A concept descriptively referred to as sample spot outline circle is used to describe the above two graphic characteristics. In this concept a circle is centered at a sampling point and it has a radius equal to the gray level truncation limit $x_{N-1}$ as previously described. The gray level associated with the sampling point in consideration is determined by the black/white boundary line located within the sample spot outline circle. The gray level is not affected by the black/white boundary line located outside of the sample spot outline circle.

The region width must be selected such that there is no more than one boundary curve contained in any one sample spot outline circle of an input graph. If there are two boundary curves in the sample spot outline circle the quantitative relationship between the gray level and the black/white boundary line location (such as listed in Table I) does not apply, and the graphic conversion technique cannot be applied. The input graph shown in FIG. 3 meets this criterion of region width because none of the hundred sample spot outline circles contain more than one boundary curve, therefore, the graphic conversion technique can be applied.

The condition of the region width is necessary for the application of the graphic conversion technique but it will not guarantee satisfactory result. In addition to the necessary condition of region width, the boundary curve must be relatively smooth with respect to the sample spot outline circle. A quantitative measure of the relative smoothness is described in the following. Let $P_1$ and $P_2$ be two points at the intersections of a boundary curve with a sample spot outline circle. Let $P_3$ be the mid-point between $P_1$ and $P_2$ on the boundary curve. Let $L_{12}$ denote the straight line passing through $P_1$ and $P_2$, and let $L_3$ denote the line tangent to the boundary curve at $P_3$. Consider an input graph that has a black/white boundary line at the same location as that of $L_{12}$ with respect to the sampling point in consideration. Let $I(L_{12})$ denote the PMT output corresponding to the black/white boundary line of this input graph. In the same manner, consider another input graph with a black/white boundary line having the same location of $L_3$, and let $I(L_3)$ denote the corresponding PMT output. Let $I_b$ and $I_w$ denote the PMT outputs corresponding respectively to a totally black sample spot and a totally white sample spot. The following quantity, S, can be considered as a measure of the relative smoothness of the section between $P_1$ and $P_2$ of the boundary curve as with respect to the sampling point in consideration.

$$S = \left| \frac{I(L_{12}) - I(L_3)}{I_w - I_b} \right|$$

The relative smoothness, S, defined above can also be expressed in terms of the precision of gray level truncation N as the following, $$S = C/N$$

where $$C = N \left| \frac{I(L_{12}) - I(L_3)}{I_w - I_b} \right|$$

For the case where C<1 or S<1/N, the section of the boundary curve between P₁ and P₂ can be approximated by a straight line between $L_{12}$ and $L_3$. Because any straight line in this region would produce a gray level equal to the gray level that is produced by the original boundary curve when the CRT flying spot image is centered at the sampling point in consideration in both cases. The above statement is true only in the probability sense. The upper limit of the parameter C in the above expression can be set less than 1 to increase the probability that the approximating straight line boundary would produce the same gray level as the original boundary curve. On the other hand, the upper limit of the parameter C can be set greater than 1 to relax the restriction on the input graph set at the cost of allowing some degradation in the converted graphic data.

The relative smoothness discussed above varies with respect to the sampling point. Let S(I,J) denote the relative smoothness with respect to the sampling point (I,J), where (I,J) is the index of the sampling point as with respect to the digital picture matrix, I refers to the row and J refers to the column. Several standard statistics of the population of all S(I,J) of an input graph can be used to express the degree of applicability and the criteria of the application of the graphic conversion technique. For example, the r-th percentile of the population of S(I,J) of an input graph can be used as a criterion measure, i.e.

The r-th percentile of {S(I,J)} < C/N where {S(I,J)} denote all the individual S(I,J) of an input graph.

The relative smoothness S(I,J) depends on the sample spot outline circle, the smaller the sample spot outline circle, the smoother is the boundary curve of a given input graph. However, the lower limit of the sample spot outline circle depends on the size and illumination distribution of the CRT spot. On the other hand, the above described application criterion is a function of the precision of gray level truncation N, which has an upper limit dependent on the PMT quality. Both the CRT spot size and the PMT quality are limited by the physical limitation of the manufacturing technologies. The cost of manufacturing graphic electronic data processing systems and the difficulty in maintenance can be reduced if the extremely small size of the CRT flying spot and/or the high precision of gray level truncation are not required. There are possibilities that some optimal system design of a new graphic electronic data processing system can be achieved by the trading off between these two parameters (namely, the CRT spot size and the precision of gray level truncation). The above criterion for the relative smoothness can be used as a guide of this trade off.

The principle of construction of a boundary curve from the BTC's is to draw a smooth curve tangent to a set of BTC's so that this curve will separate the BTC's into two groups such that all the sampling points associated with the BTCs on one side of the curve are in a black region and all the sampling points associated with the BTCs on the other side of the curve are in a white region.

The BTCs are classified into four types according to their associated gray levels. The type of white BTC is that associated with the gray level W, where 0<W<N/2, the sampling point associated with a white BTC located in a white region. The type of black BTC is that associated with the gray level B, where N/2≦B<(N−1), the sampling point associated with a black BTC located in a black region. The type of degenerative white BTC is that associated with the gray level 0, the associated sampling point is located in a white region. The type of degenerative black BTC is that associated with the gray level N-1 and the associated sampling point is located in a black region.

There are four immediate neighbors and four diagonal neighbors to each BTC. Let BTC(I,J) denote the center BTC in consideration, which is associated with the sampling point (I,J). Then the four immediate neighbors are located at the sampling points, (I−1,J), (I, J−1), (I, J+1) and (I+1, J); and the four diagonal neighbors are located at the sampling points, (I−1, J−1), (I−1,J+1), (I+1, J−1) and (I+1, J+1). The neighborhood between the center BTC(I,J) and an immediate neighbor is classified into three cases. In this example, assume the precision of gray level truncation of the digital picture is N=16. In FIG. 4, the center BTC(I,J) is a black type because its associated gray level 11 meets the condition 16/2<11<15, i.e. N/2<B<(N−1) described above. The two immediate neighbors at (I, J−1) and (I+1, J) are also black type as the associated gray levels are 9 and 10. The immediate neighbor at (I−1, J) is a degenerative black type as its associated gray level is 15, i.e. N−1. The immediate neighbor at (I, J+1) is a white type because its gray level is 2, which meets the condition 0<2<16/2, i.e. 0<W<N/2.

A case I neighborhood exists when the center BTC(I,J) and the immediate neighbor in consideration belong to different nondegenerative types, i.e. either the center BTC(I,J) is a white type and the neighbor is a black type, or the center BTC(I,J) is a black type and the neighbor is a white type. For a Case I neighborhood, there is a boundary line tangent to both BTCs and the two associated sampling points lie on the opposite sides of this common tangent.

A Case II neighborhood exists when the center BTC and the immediate neighbor belong to the same nondegenerative type, i.e. if either both BTCs are white, or both are black. E.g. both the center BTC(I,J) and the immediate neighbor BTC(I+1, J) are black, therefore, the neighborhood of these two BTCs is Case II. For a Case II neighborhood, there is possibly a boundary line tangent to both BTCs and the two associated sampling points lie in the same side of the common tangent.

A Case III neighborhood exists when the immediate neighbor BTC is a degenerative type, either the degenerative black or the degenerative white type. In this case, no sufficient information is available to determine the location of the boundary line. E.g. the immediate neighbor BTC(I−1, J) is a degenerative black type, therefore, the neighborhood is Case III.

Two common tangents can be drawn to the center BTC and each immediate neighbor if the neighborhood is either Case I or Case II. However, only one of these two common tangents can be used in generating the boundary curve. The following described parameters, gray level sum (GLS) and GLS difference (GD) are used to select the common tangent that could be used in generating a boundary curve. The GLS is the sum of the gray levels associated with the BTCs that are on the same side of a common tangent. The formula of computing GLS depends on the neighborhood case, the location of the immediate neighbor, and the common tangent in consideration. For each neighborhood case, there are four immediate neighbors, and two common tangents to each immediate neighbor.

Figure 10A:
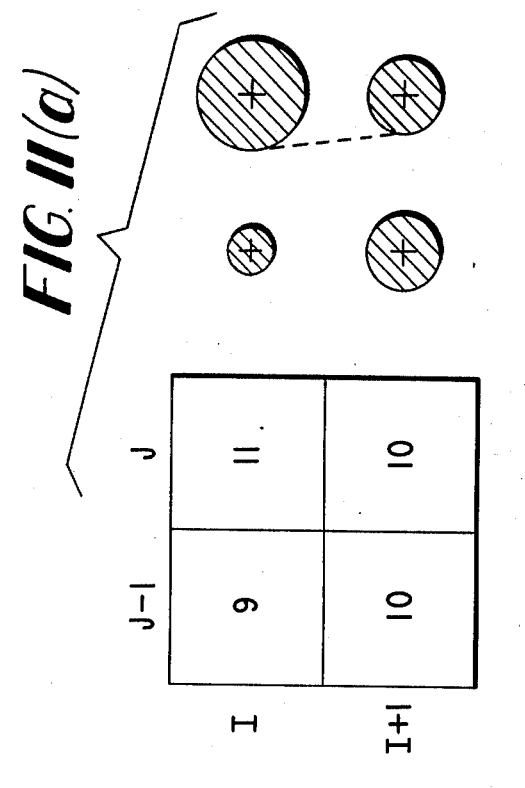
FIGS. 10a and 10b illustrate a case I BTC neighborhood.
Figure 10B:
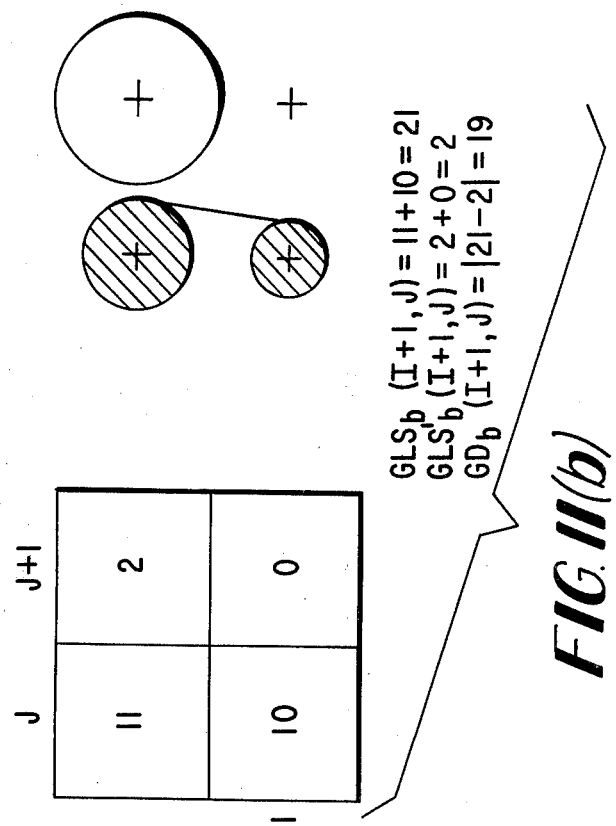
Figure 11A:
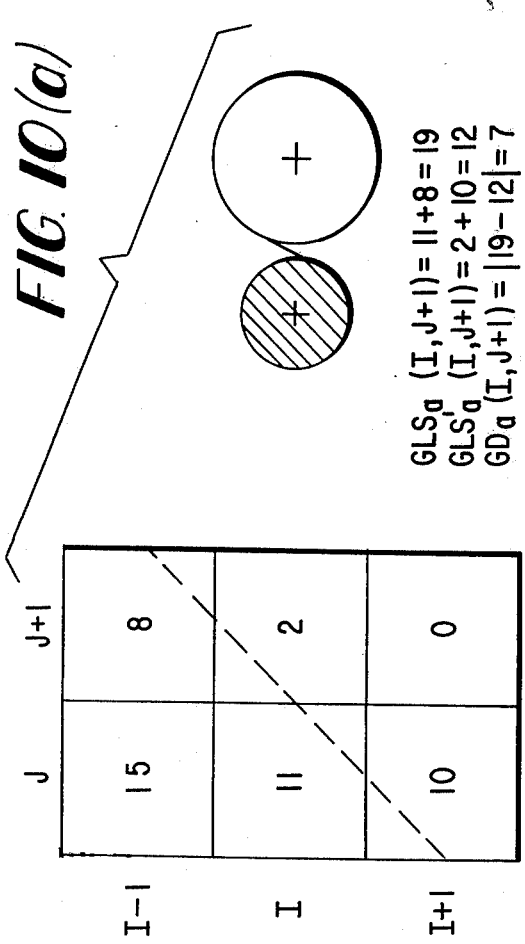
FIGS. 11a and 11b illustrate a case II BTC neighborhood.
Figure 11B:
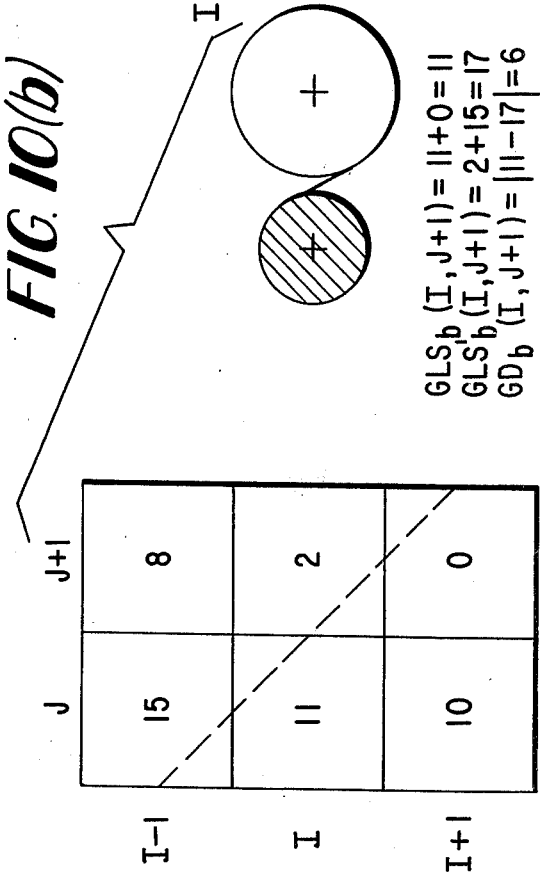

Let $G(I',J')$ denote the gray level associated with the sampling point $(I',J')$, where $(I',J')$ may be the center sampling point or any of its eight neighbors. The GLS on one side of this common tangent is computed as the following, (see FIGS. 4, 10 and 11).

$$GLS_a(I,J+1) = G(I,J) + G(I-1, J+1) = 11 + 8 = 19$$

the argument $(I, J+1)$ indicates that this GLS is associated with the neighbor BTC$(I, J+1)$. The reason of summing the $G(I,J)$ and $G(I-1, J+1)$ is that because the BTC$(I,J)$ and BTC$(I-1, J+1)$ are on the same side of the common tangent in consideration. By the same reason, the GLS on the other side of this common tangent is computed as the following, $$GLS_a'(I, J+1) = G(I, J+1) + G(I+1, J) = 2 + 10 = 12$$

where the apostrophe ' indicates that this GLS is associated with other side of the common tangent with respect to the preceeding computed $GLS_a(I, J+1)$.

The GLS difference is the difference between the two gray level sums associated with both sides of a common tangent. The GLS difference associated with the common tangent is, $$GD_a(I, J+1) = |GLS_a(I, J+1) - GLS_a'(I, J+1)| = |19 - 12| = 7$$

where $GD_a(I, J+1)$ denotes the GLS difference associated with the neighbor BTC$(I, J+1)$.

In the same manner, the gray level sums for other common tangents are computed as follows, $$GLS_b(I, J+1) = G(I,J) + G(I+1, J+1) = 11 + 0 = 11$$

and $$GLS_b'(I, J+1) = G(I, J+1) + G(I-1, J) = 2 + 15 = 17$$

The GLS difference associated with this common tangent is, $$GD_b(I, J+1) = |GLS_b(I, J+1) - GLS_b'(I, J+1)| = |11 - 17| = 6$$

The GLS difference associated with a common tangent is a measure of the relative possibility that the common tangent could be used in generating a boundary curve. Since only one of the two common tangent can be used, the one that is associated with the greater GLS difference is chosen as a candidate for the final decision and this greater GLS difference is called the candidacy coefficient, i.e.

$$CC(I'',J'') = \max \{GD_a(I'',J''), GD_b(I'',J'')\}$$

where $CC(I'',J'')$ denotes the candidacy coefficient of the BTC$(I'',J'')$. For BTC$(I, J+1)$, its candidacy coefficient is, $$CC(I, J+1) = GD_a(I, J+1) = 7$$

because $$GD_a(I, J+1) > GD_b(I, J+1).$$

The computation of the gray level sum, GLS difference, and candidacy coefficient for Case II neighborhood may be illustrated by considering that both the center BTC$(I, J)$ and the immediate neighbor BTC$(I+1, J)$ are black type. The gray level sum on one side of the common tangent is, $$GLS_a(I+1, J) = G(I,J) + G(I+1, J) = 11 + 10 = 21$$

because BTC$(I,J)$ and BTC$(I+1, J)$ are on the same side of the common tangent. The gray level sum on the other side of the common tangent is, $$GLS_a'(I+1, J) = G(I, J-1) + G(I+1, J-1) = 9 + 10 = 19$$

The GLS difference of the common tangent is, $$GD_a(I+1, J) = |GLS_a(I+1, J) - GLS_a'(I+1, J)| = |21 - 19| = 2$$

In the same manner, for other common tangents, the gray level sums and the GLS difference are, $$GLS_b(I+1, J) = G(I,J) + G(I+1, J) = 11 + 10 = 21$$

$$GLS_b'(I+1, J) = G(I, J+1) + G(I+1, J+1) = 2 + 0 = 2$$

and $$GD_b(I+1, J) = |GLS_b(I+1, J) - GLS_b'(I+1, J)| = |21 - 2| = 19$$

The common tangent is chosen as the candidate for the BTC$(I+1,J)$, when its GLS difference is greater than that of the other possible tangents. The candidacy coefficient for the common tangent is, $$CC(I+1, J) = \max \{GD_a(I+1, J), GD_b(I+1, J)\} = GD_b(I+1, J) = 19$$

If the neighborhood with respect to the immediate neighbor BTC$(I, J-1)$ is Case II, the two GLS differences associated with the two common tangents are computed as follows, $$GD_a(I, J-1) = |G(I,J) + G(I,J-1) - G(I-1,J) - G(I-1,J-1)|$$
$$= |11 + 9 - 15 - 9|$$
$$= 4$$

$$GD_b(I, J-1) = |G(I,J) + G(I, J-1) - G(I+1, J) - G(I+1, J-1)|$$
$$= |11 + 9 - 10 - 10|$$
$$= 0$$

Therefore, the common tangent associated with $GD_a(I, J-1)$ is chosen as the candidate for BTC$(I, J-1)$, and its candidacy coefficient is, $$CC(I, J-1) = GD_a(I, J-1) = 4$$

If the neighborhood with respect to the immediate neighbor BTC$(I-1, J)$ in Case III, because BTC$(I-1, J)$ is a degenerative type. There is no common tangent to this BTC, and no gray level sum is computed. However, for the convenience in the design of an automatic system, the GLS differences and candidacy coefficient are assigned to be zeros, i.e.

$GD_a(I-1, J) = 0$ $GD_b(I-1, J) = 0$ and $CC(I-1, J) = 0$

In general, there are four chosen common tangents to a center BTC, each of these common tangent associates with an immediate neighbor BTC. However, in generating a boundary curve, only two of these four candidates can be used. The two common tangents that are finally selected are called the boundary associative common tangents. They have the greater candidacy coefficients. For instance, assume the four candidacy coefficients of the four immediate neighbor BTCs are as follows, $CC(I-1, J) = 0$ $CC(I, J-1) = 4$ $CC(I, J+1) = 7$ $CC(I+1, J) = 19$ Then the common tangents associated with $CC(I, J+1)$ and $CC(I+1, J)$ are selected as the boundary associative common tangents.

From the above operation, two tangent points on the center BTC are generated, each tangent point associates with one of the two boundary associative common tangents. These tangent points are the type I boundary points. In the same manner, every non-degenerative type I BTC is considered as the center BTC and two type I boundary points can be generated on it. A boundary curve can be constructed by connecting a set of these type I boundary points in a certain order.

The boundary curves constructed by connecting the type I boundary points are rough approximations of that in the original input graph. Many more sophisticated curve fitting methods can be explored to construct the boundary curves based on the BTCs so that the results would better approximate that in the original input graph. The following is such an alternate method which is referred to as the boundary associated tangent (BAT) method. It relates more closely to the BTC boundary curve fitting concept than the above discussed type I boundary points method, see FIG. 12.

Let $A(I,J)$ and $B(I,J)$ denote the two type I boundary points on a center $BTC(I,J)$ in consideration. The center $BTC(I,J)$ is divided into two arcs by the two type I boundary points, $A(I,J)$ and $B(I,J)$. Let $C(I,J)$ denote the mid-point on the shorter arc on $BTC(I,J)$. A tangent to $BTC(I,J)$ can be drawn through the mid-point $C(I,J)$. Let $T(T,J)$ denote this tangent. A black/white boundary line aligned with the tangent $T(I,J)$ would produce the same gray level that generated the $BTC(I,J)$. Therefore the section of the tangent $T(I,J)$ within the sample spot outline circle of this sampling point $(I,J)$ is a good approximation of the original boundary curve in the input graph. The section of $T(I,J)$ within the sample spot outline circle is called the boundary associative tangent. In the same manner, a boundary associative tangent can be drawn for every non-degenerative type BTC of a digital picture. The boundary curves in a graph can be constructed by connecting these boundary associative tangents. The boundary associative tangent method relates closely to the principle of the BTC boundary curve construction, but it has more practical difficulties in the design of an automatic system. In addition, the result of this method is not necessarily better than the type I boundary points method. Therefore, the latter is recommended for practical use, and the implementation of the method of type I boundary points is discussed below.

The order in connecting the boundary points is essential for construction of a boundary curve. The first step is to search for a nondegenerative type BTC in the digital picture. The search procedure may be simply by checking each BTC in a row from left to right, starting from the top row. When a nondegenerative type BTC is found, consider this BTC as the center and select its two boundary associative BTCs as described in the preceding paragraphs. Let $BTC(I_2,J_2)$ denote this center BTC, $BTC(I_1,J_1)$ and $BTC(I_3,J_3)$ denote the two boundary associative BTCs. Compute the coordinates of the tangent points on $BTC(I_2,J_2)$ and $BTC(I_3,J_3)$ associated with the chosen boundary associative common tangent. Let $BP_b(I_2,J_2)$ denote the tangent point on $BTC(I_2,J_2)$, and $BP_a(I_3,J_3)$ denote that on $BTC(I_3,J_3)$. Note that $BP_b(I_2,J_2)$ and $BP_a(I_3,J_3)$ are the type I boundary points as defined previously.

The subscripts a and b are important in connecting the boundary points.

The next step is to consider $BTC(I_3,J_3)$ as the center BTC. Therefore, $BTC(I_2,J_2)$ is one of the two boundary associative BTC for the current center $BTC(I_3,J_3)$. Select the other boundary associative BTC as previously described, denote it as $BTC(I_4, J_4)$. Compute the coordinates of the type I boundary points associated with the chosen boundary associative common tangent that associates with the current center $BTC(I_3,J_3)$ and the newly selected $BTC(I_4,J_4)$. Let $BP_b(I_3,J_3)$ denote the type I boundary point on $BTC(I_3,J_3)$ and $BP_a(I_4,J_4)$ denote that on $BTC(I_4,J_4)$.

The proceding procedure is the basic operation in the boundary points generation and is repeated many times. Let $BTC(I_m,J_m)$ denote the current center BTC, and $BTC(I_{m-1},J_{m-1})$ denote one of its boundary associative BTC that was considered as the center BTC in the immediately preceeding step. Let BTC $(I_{m+1},J_{m+1})$ denote the other boundary associative BTC newly selected in the current step. (Whereas the $BTC(I_{m+1},J_{m+1})$ will be considered as the center BTC in the immediately following step.) Let $BP_a(I_m,J_m)$ and $BP_b(I_m,J_m)$ denote the two type I boundary points on the current center $BTC(I_m,J_m)$, where $BP_a(I_m,J_m)$ associates with the boundary associative common tangent that was derived from the boundary associative $BTC(I_{m-1}, J_{m-1})$, and $BP_b(I_m,J_m)$ associates with that which was derived from the boundary associative $BTC(I_{m+1}, J_{m+1})$. Note that the subscripts a and b in the type I boundary point notation indicate that the boundary points are associated respectively with the past center BTC, i.e. $BTC(I_{m-1}, J_{m-1})$ and the future center BTC, i.e. $BTC(I_{m+1}, J_{m+1})$.

This basic operation is repeated until one of the following situations occur: (1) the newly selected boundary associative $BTC(I_{m+1}, J_{m+1})$ was considered as a center BTC in a previous step, and (2) all the remaining immediate neighbor BTCs are degenerative type. Note that there are three remaining immediate neighbors in general. But there are only two remaining immediate neighbors if the center BTC is at the edge of the input graph, or the digital picture, and only one remaining immediate neighbor if the center BTC is at a corner of the graph. Let $BTC(I_M, J_M)$ denote the last center BTC in the search of a boundary curve. There are 2 M type I boundary points generated during the searching procedure. A boundary curve can be constructed by connecting these 2 M type I boundary points in the following order: Connect $BP_a(I_m, J_m)$ to $BP_b(I_m, J_m)$, and connect $BP_b(I_m, J_m)$ to $BP_a(I_{m+1}, J_{m+1})$; and repeat the above connection procedure for all m's, i.e. for m=1, 2, ..., M.

The above procedure of connecting the set of type I boundary points that are generated in a searching operation can be repeated to construct the many boundary curves until all nondegenerative BTCs in a digital picture are processed.

While particular embodiments of the present invention have been shown and described, it of course will be obvious to those skilled in the art that certain changes and modifications may be effected without departing from the invention in its broader aspects, and, accordingly, the intent of the appended claims is to cover all such changes and modifications as fall within the true spirit and scope of the invention.

Accordingly, what I claim and desire to protect by letters patent is:

1. A method of graphic conversion for electronic data processing, comprising the steps of:
   interpreting an image as a first analog electrical signal;
   converting said first analog electrical signal into digital signals representing discrete, identifiable segments of said image and containing quantitative data representing a color value for said segments;
   generating a boundary tangent circle for each of said segments as a function of said segment quantitative color data;
   generating two pairs of common tangents to said boundary tangent circle for each of said segments as a function of adjacent segments quantitative color data;
   selecting one tangent from each of said two pairs of common tangents as dominant tangents as a function of adjacent segments quantitative color data;
   generating a second analog electrical signal as a continuous function of said dominant tangents of adjacent segments; and
   converting said second analog electrical signal into a visual display.

2. A method as defined in claim 1 wherein said steps of interpreting an image as a first analog electrical signal includes the substeps of:
   irradiating an image with a relatively small spot of radiation traveling over said image in a predetermined pattern;
   detecting the reflection of said radiation from said image; and
   generating a first analog electrical signal as a function of the amount of reflected radiation detected.

3. A method as defined in claim 2, further including the steps of storing said digital signals.

4. A method as defined in claim 3, further including the steps of manipulating said stored digital signals to modify said visual display in a predetermined manner.

5. A method as defined in claim 1 wherein said steps of interpreting an image as a first analog electrical signal includes the substeps of:
   irradiating an image with a matrix of spot-light source of radiation traveling over said image in a predetermined pattern;
   detecting the reflection of said radiation from said image; and
   generating a first analog electrical signal as a function of the amount of reflected radiation detected.

6. A method as defined in claim 1 wherein said steps of interpreting an image as a first analog electrical signal includes the substeps of:
   irradiating an image with a column of radiation traveling over said image in a predetermined pattern;
   detecting the reflection of said radiation from said image; and
   generating a first analog electrical signal as a function of the amount of reflected radiation detected.

7. A method as defined in claim 1 wherein said steps of interpreting an image as a first analog electrical signal includes the substeps of:
   irradiating an image with a relatively small spot of radiation traveling over said image in a predetermined pattern;
   detecting the transmission of said radiation from said image; and
   generating a first analog electrical signal as a function of the amount of transmitted radiation detected.

8. A machine implementable process for enhancing the resolution of a two-dimensional graphic image represented by an array of picture elements in digital form, each element corresponding to a predetermined region centered around a known point of said image, and each element having a grey scale value corresponding to the grey scale value sensed at said point, comprising the steps of:
   (a) converting each picture element via electronic means into signals emulating a circle centered at said point and having a radius corresponding to a predetermined grey scale value of said circle;
   (b) electronically characterizing each circle as one of four types depending on the particular grey scale value of said circle;
   (c) electronically characterizing the region between a selected two adjacent circles as one of three neighborhood cases depending on the particular types of said two circles;
   (d) electronically determining a candidate coefficient by finding the greater value of first and second sums derived from selected combinations of grey scale values of said two circles and of selected adjacent circles;
   (e) electronically connecting said two circles by a common tangent particularized in response to said determined candidate coefficient when the neighborhood of said two circles are electronically found to be of either the first or second cases; and
   (f) electronically examining each two adjacent circles so as to iteratively repeat the steps of (b) through (e) above at least once for each combination of adjacencies of said circles, and electronically interconnecting said common tangents to form continuous boundary tangent curves thereby enabling graphical replication of the original graphic image.

9. The process of claim 8 further comprising the step of producing a processed replica of said original graphic image utilizing said continuous tangent curves as inputs to guide, in part, a graphic display means.

10. The process of claim 9 wherein said four circle types are characterized as:
   (a) a regular white type when said grey scale value is less than one half of the full possible range of grey scale values and is not wholly white;
   (b) a regular black type when said grey scale value is greater than or equal to one half of the full possible range of grey scale values and is no wholly black;
   (c) a degenerate white type when said grey scale value is wholly white;
   (d) a degenerate black type when said grey scale value is wholly black; and
   wherein said three neighborhood cases are characterized as:
   (e) a case one neighborhood when said two circles are of the same kind of regular type;
   (f) a case two neighborhood when said two circles are of different kinds of regular types; and
   (g) a case three neighborhood when at least one of said circles is a degenerate type.

11. The process of claim 10 wherein said first sum contains an algebraic addition of grey scale values of said selected two adjacent circles and a first additional adjacent circle and the most jointly proximate included diagonal circle, and wherein said second sum contains an algebraic addition of grey scale values of said selected two adjacent circles and a second additional adjacent circle and the most jointly proximately included diagonal circle.

* * * * *